Patented Mar. 12, 1940

2,193,729

UNITED STATES PATENT OFFICE 2,193,729

ORTHO-HYDROXY DISAZO DYESTUFFS AND THEIR MANUFACTURE

Adolf Krebser, Riehen, near Basel, Switzerland, assignor to J. R. Geigy A. G., Basel, Switzerland No Drawing. Application September 6, 1938, Serial No. 228,690. In Switzerland September 7, 1937

4 Claims. (Cl. 260—191)

Ortho-hydroxy disazo-dyestuffs, which contain m-amino-p-cresol (4-methyl-2-amino-1-hydroxybenzene) in the middle position, are known.

They are produced by combining diazo-compounds with aryl-sulphonic acid esters of m-amino-p-cresol; the azo-dyestuffs obtained are diazotized and after further coupling with azo-dyestuff components, the aryl sulphonic group is eliminated by saponification.

According to the process of the U. S. Patent 993,549 dyestuffs of the same composition are obtained more simply and with greater purity when p-amino-m-hydroxy-azo dyestuffs of the type

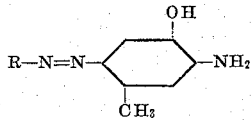

(R=radical of an aromatic amino sulphonic or carboxylic acid or of a substitution product thereof), which are produced by coupling aromatic diazo sulphonic or carboxylic acids or their substitution products with 4-methyl-2-amino-1-hydroxybenzene in the presence of a thio-salt such as thio-sulphates, rhodanates or xanthates, are diazotized and the diazo-compounds obtained are coupled with azo-dyestuff components. There are described the dyestuffs with α- and β-naphthol, 1:8-dioxynaphthalene-3:6-disulphonic acid, m-toluylene-diamine, resorcinol, 2:5-amino-naphthol-7-sulphonic acid and 2-naphthol-7-sulphonic acid and 2:7-dihydroxynaphthalene.

According to the present invention new and valuable ortho-hydroxy disazo-dyestuffs are obtained by using N-aryl derivatives of the 1-amino-8-naphthol-4-sulphonic acid instead of the above mentioned azo components. The process of the U. S. Patent 993,549 or the method of coupling with aryl sulphonic acid esters of m-amino-p-cresol may be used for the production of these new dyestuffs.

The after-chromed acid dyeings of the new dyestuffs show, in comparison with the bluish-green chromed dyeings of the dyestuffs according to the U. S. Patent 993,549, a marked change of the color shade towards yellowish-green, which is technically important, and further in general they possess an improved fastness to light.

The following example illustrates the invention, the parts being by weight.

30.7 parts of the mono-azo-dyestuff, obtained from diazotized sulphanilic acid and m-amino-p-cresol according to the process of the U. S. Patent 993,549 are dissolved in water with 6 parts of anhydrous sodium carbonate, treated with 7 parts of nitrite and acidified in the usual manner with hydrochloric acid. The diazotizing is soon completed. The brownish-yellow diazo body is added to a sodium carbonate alkaline solution of 32 parts of 1-phenylamino-8-hydroxynaphthalene-4-sulphonic acid, which contains 15 volumes per cent of pyridine. The combination is completed in a few hours. The new dyestuff is filtered off as usual and dried; it constitutes a dark powder which dissolves with a blue color in water and with a green color in concentrated sulphuric acid. It dyes wool from an acid bath in blue shades, when after-treated with bichromate in fast, yellowish-green shades.

Instead of the sulphanilic acid used as first component, the other aromatic amino sulphonic or carboxylic acids or their substitution products mentioned in the U. S. Patent 993,549 may be used; there may be named: metanilic acid, m-nitraniline-p-sulphonic acid, o-chloraniline-m-sulphonic acid, p-aminobenzoic acid.

Similar dyestuffs are also obtained when using for example 1-(4'-tolyl)-amino-8-hydroxynaphthalene-4-sulphonic acid. Similar dyestuffs are obtained when using the m-amino-p-cresol aryl sulphonic acid esters as middle component and eliminating the aryl sulphonic acid in the finished disazo-dyestuff.

What I claim is:

1. Ortho-hydroxy disazo-dyestuffs capable of being chromed, corresponding in the form of the free acid to the following general formula

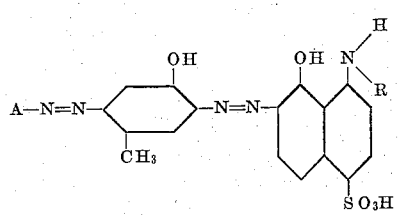

wherein A represents an acid aromatic radical selected from the group consisting of sulphonic and carboxylic acids of the benzene series and R means an aryl radical of the benzene series, said dyestuffs being dark powders, soluble in water and dyeing wool from an acid bath in blue shades, after-chromed in fast yellowish-green shades.

2. Ortho-hydroxy disazo-dyestuffs capable of being chromed, corresponding in the form of the free acid to the following general formula

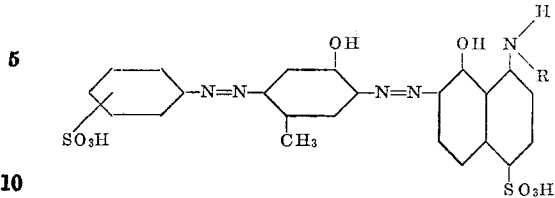

wherein R means an aryl radical of the benzene series, said dyestuffs being dark powders, soluble in water and dyeing wool from an acid bath in blue shades, after-chromed in fast yellowish-green shades.

3. The ortho-hydroxy disazo-dyestuff capable of being chromed, corresponding in the form of the free acid to the following formula

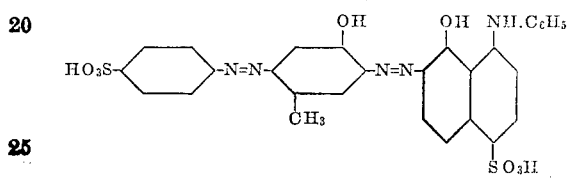

being a dark powder soluble in water with a blue color and in concentrated sulphuric acid with a green color and dyeing wool from an acid bath in blue shades changing by an after-treatment with bichromate to fast yellowish-green shades.

4. The ortho-hydroxy disazo-dyestuff capable of being chromed, corresponding in the form of the free acid to the following formula

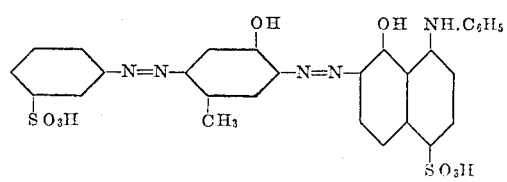

being a dark powder soluble in water with a blue color and in concentrated sulphuric acid with a green color and dyeing wool from an acid bath in blue shades changing by an after-treatment with bichromate to fast yellowish-green shades.

ADOLF KREBSER.